United States Patent Office 3,829,343
Patented Aug. 13, 1974

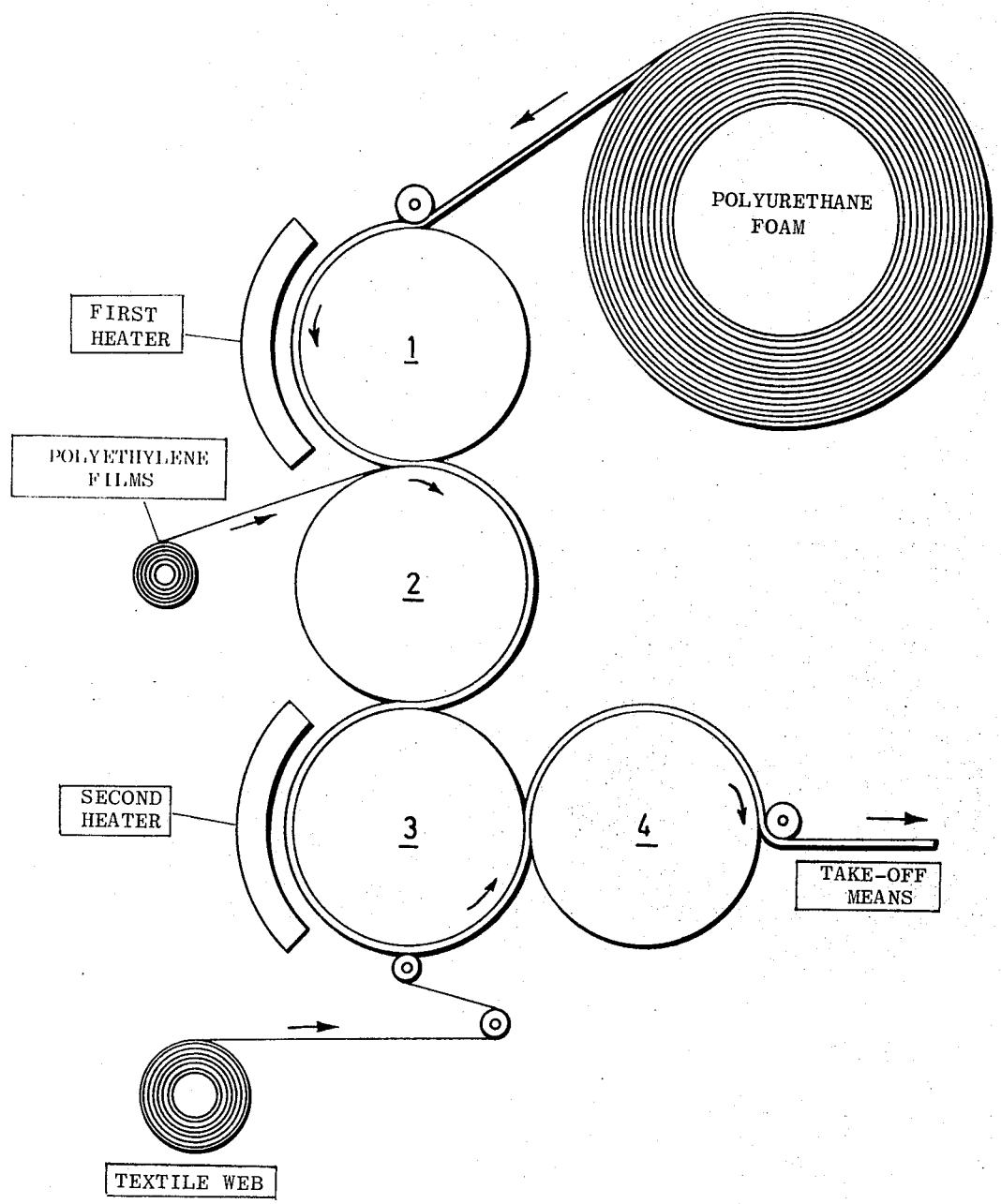

3,829,343
PROCESS FOR LAMINATING A FOAM PLASTICS MATERIAL WITH A SHEET-LIKE MATERIAL
Hans-Jürgen Remmert, Wiesbaden, Germany, assignor to Koepp Aktiengesellschaft, Ostrich, Rheingau, Germany
Filed Feb. 17, 1972, Ser. No. 227,110
Claims priority, application Austria, Feb. 19, 1971, A 1,444/71
Int. Cl. C09j 5/00
U.S. Cl. 156—322                                                    11 Claims

ABSTRACT OF THE DISCLOSURE

Previous laminates of foam plastics materials with a sheet-like material have been prepared by flame laminating with the use of a costly polyurethane hot-melt adhesive with unsatisfactory adhesive properties. Laminates having improved properties can be prepared with the use of an inexpensive melt or thermoplastic adhesive film by a process comprising softening a surface of the foam material by applying thereto an amount of heat such that an insufficient amount of melted or decomposition products are obtained to enable a lasting adhesive bond to be made between the two materials, uniting the softened foam material surface with a film of melt adhesive, melting the film and contacting the sheet-like material with the melt to form an integral lined foam material. The laminate can be made poromeric or able to "breathe" by appropriately selecting the thickness of the thermoplastic adhesive film.

---

This invention relates to a process for laminating foam plastic material.

The process of laminating foam plastic materials, in particular polyurethane foams, with sheet materials especially textiles or webs of synthetic plastics material, which may themselves also exist in foamed form, is at present preferably carried out by the method known as "flame-laminating," and is disclosed for example, in German Patent Specification No. 1,128,123. This process involves the direct action of a flame on a surface of the foam plastic material, such that some of the foam material is burnt away to leave sticky decomposition products which ensure permanent bonding of the materials to be joined together. It is also possible to use hot gases or infra-red radiation instead of the directly impinging flame, as is described in German Patent Specification No. 1,016,680 or French Patent Specification No. 1,550,743.

When using such processes, droplets of sticky or tacky decomposition products from the foam layer are obtained and then the textile or the other material in web form is immediately pressured onto the tacky surface. The main advantage of this process, in addition to its high rate of production is that the melted droplets which have formed on the edges of the foam cells are unable to form a closed layer and consequently the finished material can "breathe" and has a soft "handle." However, a disadvantage of these processes is that the final laminated product tends to delaminate, and further more the adhesive (that is, the polyurethane which is foamed and then melted) is quite expensive and a considerable amount must be used to produce satisfactory adhesive bonding results. In German Patent Specification No. 1,128,123 it is stated that the thickness of the polyurethane layer which should be burnt off is in the range of from about 0.15 to 0.8 mm., however, in the case of the lower volumes in the range, very weak bonding strengths are obtained. For example, the bonding strength between a web of polyurethane foam material and a polyamide woven tricot, when a layer thickness of 0.15 mm. of the polyurethane foam is bruned away is 0.0191 kg./cm. Consequently, to produce satisfactory bonding between such materials, it is necessary for a considerable thickness of the foam material to be burnt away, and it is usual to burn away at least 0.4 mm., preferably about 0.6 mm. Hence it can be seen that with a polyurethane foam having a weight to volume ratio of 25, it is necesary to have 10 g./m.² of foamed polyurethane present even when burning off only 0.4 mm.

Many experiments have been carried out to find a way of replacing this costly "polyurethane hot-melt adhesive," which further often possesses inadequate adhesive properties such replacement hot-melt adhesives should have better adhesive properties and be in a more economical form, such as powder, film, solution or dispersion form. From the replacements found, it is possible, with comparable quantities of the material (i.e. about 10 to 15 g./m.²) to obtain bonds which are superior to those obtained from flame liming.

However, such hot-melt adhesive processes do not reach the working speed of the flame lining processes and furthermore require the additional preparatory step of distributing the hot melt adhesive in small quantities, uniformly over the entire surface which is to be lined. Thermoplastic resins are usually employed as the adhesive resins, and it is necessary for them to be made into solution or dispersion form or to be crushed by grinding or other fine distribution methods and then applied (for example, in the form of a screen or grid) to the foam or textile and melted thereon.

Several thermoplastic resins are suitable as hot-melt adhesives, in particular, polyethylene, which is very suitable for laminating textiles, and can now be produced quite cheaply in the form of extremely thin film of density 12 to 15 g./m.². Consequently, a bonding process has been developed in which the foam, polyethylene film and textile are laminated and then heated through the textile until the polyethylene has melted and the union produced. With the correct amount of heating, this process provides active "breathing" laminates with a good feel, because the thin layer of polyethylene forms small droplets in the melting procedure and thus does not form any barrier layer. It is, however, a considerable disadvantage that the heat has to be transferred through the textile material. The textile material may be incapable of withstanding the necessary temperatures and, furthermore heat transfer through the material, especially through relatively thick textiles, is rather slow and leads to an unacceptably slow working procedure.

It is the object of the present invention to develop a process in which the polyurethane adhesive produced by burning is replaced by a hot-melt adhesive, especially a thermoplastic synthetic resin, which is introduced into the lining, so that the hot-melt adhesive is available for the process in the form of inexpensive thin film.

It is a further object of the invention to supply between the foam plastic and the material in web form "breathing" bonding materials having a soft feel.

In particular it is an object of the present invention to develop a process which permits polyethylene or other comparable polyhydrocarbon film to be used as hot-melt adhesives, without having the disadvantages previously mentioned. Particular difficulties arise when using polyhydrocarbon film in prior art processes, because inexpensive film, especially polyethylene film, are biaxially stretched during their method of production (blown film) and when this deformation is removed, considerable shrinkage of the film takes place at temperatures which are still considerably below its melting point.

The present invention provides a new process which avoids the previously mentioned difficulties. It can be used generally for the foam plastic laminating using hot-melt adhesives in film form, but has particular use in the laminating of polyurethane foam plastic materials, especially flexible polyurethane foams. The new process permits the use of, for example, extremely inexpensive polyethylene film as hot-melt adhesives in in the manufacture of multilayer materials which can "breathe."

According to the invention, there is provided a process for laminating a foam plastics material with a sheet-like material in which the two materials are held together by a melt adhesive having a softening point below the softening or decomposition point of the foam material, comprising softening a surface of the foam material by applying thereto an amount of heat such that an insufficient amount of melted or decomposition products are obtained to enable a lasting adhesive bond to be made between the two materials, uniting the softened foam material surface with a film of melt adhesive, melting the film and contacting the sheet-like material with the melt to form an integral lined foam material.

In a preferred embodiment of the process of the invention, the melt adhesive, introduced in the form of a film is attached comparatively loosely to the foam plastic surface in a first step of the process. It is unnecessary for this purpose to burn away considerable amounts of the polyurethane foam material and it is quite sufficient to soften the uppermost foam plastic layer. It is possible for a comparatively slight reduction in the thickness of the foam plastic layer to occur with this softening, because of collapsing of the pore rims. This reduction in layer thicknesses does not however generally amount to more than 0.3 mm., advantageously less than 0.2 mm., and for practical purposes, it was found that a reduction in the thickness of from 100 to 150$\mu$ can take place. However, the typical droplet-shaped decomposition fusion products of the flame laminating process are not formed in this case, as in fact, only the outer rims of the pores are softened.

The melt adhesive is then introduced into this softened foam plastic surface in the form of a thin film. The softened rims of the polyurethane foam plastic engage on the film and fix it in its position. The bonding forces developed would however be far too weak to provide a permanent bond between the foam plastic and melt adhesive film, for mechanical stresses. but in any case, this is not necessary at this stage, In the next stage of the process, the fixed melt adhesive film is melted for example, by playing a flame or hot gases thereon and/or by the action of infra-red radiation. In this operation, the thin melt adhesive foil is melted into extremely fine droplets, which adhere to the rims of the pores of the foam plastic surface. In this way there is provided a tacky foam plastic surface, which to a certain extent is equivalent to the intermediate stage of the flame-laminating process, with the exception that in the process of the invention, the tacky droplets are not formed by polyurethane decomposition products, but by the hot-melt adhesive. The sheet material which is to form the lining is then introduced into the tacky foam plastic surface. The materials are united with one another, preferably by a continuous process, and are fixed or set until a sufficiently firm union is obtained by solidification of the hot-melt adhesive.

The thickness of the hot-melt adhesive film is dependant on the bonding material and the purpose for which it is used. For comparatively coarse materials, in which permeability and breathing activity are of no importance or have only insignificant importance, for example, carpeting materials, it may be desirable to use comparatively thick film of the hot-melt adhesive. In this case, a considerable quantity of melted adhesive is then made available for the laminating operation.

It is a difficult matter when permeable and especially active breathing materials are to be produced. The thickness of the film of adhesive is then preferably restricted in such a way according to the invention that, with the subsequent melting of this film onto the foam plastic material and with the subsequent lining operation, an adhesive bond which can "breathe" is formed. The quantity of the adhesive is therefore limited so that, the melted film does not seal the porous foam plastic surface by a homogeneous or at least substantially homogeneous layer of the adhesive, but that only the melted products in droplet form are developed on the rims of the pores in the polyurethane foam plastic material.

It has been found that film thicknesses below 200$\mu$ and, in particular, film thicknesses in the range from 10 to 100$\mu$ are particularly suitable. For the production of coarse materials, film thicknesses from 50$\mu$ upwards may be desirable. In the manufacture of bonded materials with active breathing properties, for example, in clothing or for upholstery purposes, the range of foil thicknesses are preferably from 10 to 50$\mu$, more preferably 10 to 30$\mu$. Furthermore, the disadvantages associated with the shrinkage of blown polyethylene film, for example with the layer thickness from 15 to 20$\mu$, are overcome because the film is fixed to the foam surface to such a degree, in the first processing stage, that the shrinkage of the film caused by subsequent heating is absorbed.

It is possible to use as hot-melt adhesives the materials previously used, but now in the form of film. Hence for economic reasons, particularly interesting are the inexpensive polyolefine film, especially polyethylene or polypropylene film. It is also possible to use plasticized film of polyamides, polystyrene and its copolymers, polyvinylchloride and/or polyvinylacetate, or their copolymers, or film of any material which is of importance in the art of hot-melt adhesives or the welding of foam plastic materials.

In the process of the invention, self-supporting film can be used as hot-melt adhesives, as can materials which cannot or can only with difficulty be processed into self-supporting film. One example is polyvinylacetate, which is an excellent hot-melt adhesive, but can only be produced with difficulty as a self-supporting film. In such cases, the hot-melt adhesive is used as a so-called transfer film, i.e. a film-like layer of the hot-melt adhesive is applied to a support, for example, paper cellophane or a synthetic plastic sheeting, possibly after applying a release material to the support. This adhesive layer together with the support, is then attached to the softened foam plastic surface, the support removed and the hot-melt adhesive film melted and used as the adhesive material in the subsequent lining operation.

The heating of the foam plastic surface is advantageously regulated, according to the nature of the melt adhesive being used so that temperatures in the region of or above the melting point of the film adhesive are obtained on the heated and softened foam plastic surface when the foam plastic and adhesive film are united.

All materials which can be permanently united with the type of melt adhesive being used are suitable for joining to a foam plastic web, particularly a polyurethane foam plastic web, in accordance with the invention. The process of the invention is of particular significance for laminating foam plastic webs with textiles (woven or knitted fabrics or fleeces).

Recently, considerable interest is being shown in bonding materials which can join together a foam plastic layer and a textile velour layer. The process of the present invention can be modified to do this and there is now described a process in which a veloured textile web is laminated with a foam plastic layer. The modificatoin is particularly simple and produces a material which is very efficient from the point of view of feel and also breathing activity. The process comprises providing a sufficient quantity of the melted hot-melt adhesive on the outer surface of the foam plastic and then immediately building up an artificial velour layer in this hot-melt adhesive layer. The textile velour layer, which is preferably erected by electrostatic means, is immediately consolidated on the rims of the foam plastic pores in the hot-melt adhesive layer which is solidifying.

However, not only textile materials, but also other sheet-like materials, for example, synthetic plastic sheeting, i.e. closed plastic film or more especially also foamed plastic film, can be united in this way with the foam plastic.

In all cases, use is always made of the inexpensive hot-melt adhesive supplied as a film instead of the comparatively costly adhesive resulting from the decomposition of polyurethane.

The process, according to the invention, provides a number of additional important advantages as compared with the hot-adhesive process initially referred to. When using polyethylene film, according to the process of the invention, the thickness of the textile is of no importance and it is also unnecessary to heat the textile to temperatures which are above the melting point of the polyethylene adhesvie. The advantages which are produced here, for example, when using temperature-sensitive textile materials, are obvious.

The invention is further illustrated by reference to the accompanying drawing. In FIG. 1, a preferred embodiment of the process is described.

Soft polyurethane foam is supplied in the form of an endless web over roller 1 and, by means of a heating device on the outer surface remote from roller 1, is heated to a surface temperature which is above the melting point of the hot-melt adhesive, but is below the melting or decomposition point of the polyurethane.

The film of the hot-melt adhesive, for example, polyethylene film, which is in contact with roller 2 travels in the gap between roller 1 and roller 2. As the united material travels around the roller 2, which is preferably cooled the required union between the polyurethane foam and the polyethylene film is produced.

The foam as thus coated then runs over a third roller 3, the adhesive film again taking up a position on the outside. In travelling over this roller, the united material travels through a second heating zone, possibly of the type previously described. The film of the hot-melt adhesive is thus melted, without there being any melting or decomposition effects on the polyurethane foam base. The molten polyethylene forms into small droplets, which become seated on the cut edge of the cells of the polyurethane foam.

As soon as this result is obtained, textile web is moved alongside and forced into the polyethylene melt by passage through the gap between roller 3 and roller 4. Roller 4 is a cooling roller, and after a limited residence time on this roller the composite material is drawn off.

This process can be modified in its form and procedure. For example, the processing steps on the rollers 1 to 3 can be combined on a large roller having two heating zones or the processing stages can be carried out, separated in space and/or time. In particular, it is therefore unnecessary for the primarily obtained composite material of polyurethane foam and hot-melt adhesive film to be further processed immediately. The material as such can be stored. It is therefore convenient for handling purposes and can thus be separated and used at a later time in the laminating operation.

The respective heating can be effected for example by radiating heat, directly impinging hot gases or flames on the material to be heated or by contact with a hot roller.

The laminating of a foam plastic layer on both sides so as to produce materials with a double-sided covering (so-called bondings) is also possible. Furthermore, polyether-polyurethanes and polyesterpolyurethanes in foam form can be used instead of polyurethane foam in the process of the invention.

The following Examples illustrate the invention.

EXAMPLE 1

A web of polyether-polyurethane foam having a thickness of 10 mm. and a weight of about 54 kg./m.$^3$, while travelling at a speed of about 30 m./min., is heated on one surface by means of an open flame so that the rims of the cell walls reach a temperature of about 300° C. Immediately after passing through the gas flame, a polyethylene film of 50$\mu$ thickness is continuously pressed on to the heated foam web surface by means of a pressure roller. The polyethylene film melts superficially and adheres to the polyether foam.

The foam web as thus pretreated and laminated is moved in a second working step past an open gas flame, the web travelling at a speed of 17 m./min. The effect of the flame is to melt the polyethylene film into droplets. Immediately after passing through the flame, the back of a carpeting material is brought against the polyethylene melt and the doubled product is compressed for a short time with a squeezing roller until it has cooled.

In this way, carpeting having a foam plastic back is obtained, in which the carpet and the foam are bonded to one another in an excellent manner by the polyethylene.

EXAMPLE 2

A web of polyester-polyurethane foam having a thickness of 5 mm. and having a weight of about 30 kg./m.$^3$ is moved at a speed of about 20 m./min. past an infrared radiator at a spacing of 2 to 3 mm. from the heater. Immediately after the infra-red radiator, a 20$\mu$ thick polyethylene film is pressed on to the foam plastic surface such that the film becomes superficially melted and united with the polyester foam.

The polyethylene film is then melted into drops by means of a gas burner at a second heating source. Immediately after leaving this second heating source, a carpeting material, consisting of polyethylene spliced web/acryl fibres is pressed against the melted polyethylene mass.

In this way, a polyethylene spliced web/acryl fibre carpeting material is obtained which has a polyurethane foam backing firmly lined thereon.

EXAMPLE 3

In a bonding machine comprising two heating positions, a polyethylene film 20 thick is bonded on both sides of polyester-polyurethane foam web which is 12 mm. thick and has a weight of about 40 kg./m.$^3$, using a working speed of 50 m./min. The one burner setting is adjusted to such that the surface of the foam web does not melt, but is only heated so that the polyethylene film is softened on the surface and adheres to the polyester foam.

In a second passage through the same bonding machine, using a working speed of 30 m./min. and a more powerful burner setting, the polyethylene film is melted into droplets on both sides of the film and, immediately after passing the burner acryl fibre knitted fabrics are incorporated as a lining into the polyethylene melt.

In this way, a sandwich formation is obtained, consisting of a top layer of polyurethane foam and a base material, which serves for example for covering furniture and motor vehicle furnishings.

What is claimed is:

1. A process for laminating a foam plastics material with a sheet-like material in which the two materials are held together by a melt adhesive having a softening point below the softening or decomposition point of the foam material, comprising softening a surface of the foam material by applying thereto an amount of heat such that an insufficient amount of melted or decomposition products are obtained to enable a lasting adhesive bond to be made between the two materials, uniting the softened foam material surface with a film of melt adhesive, melting the film and contacting the sheet-like material with the melt so-provided to form an integral lined foam material.

2. A process as claimed in Claim 1 in which the thickness of the melt adhesive film is such that the laminated foam material is able to "breathe."

3. A process as claimed in Claim 1 in which the melt adhesive is used in the form of a self-supporting film.

4. A process as claimed in Claim 1 in which the film of melt adhesive is combined with a supporting web, the adhesive face of the combination is placed on the softened foam surface and then the supporting web is removed before further processing of the adhesive.

5. A process as claimed in Claim 1 in which the foam material is a polyurethane foam.

6. A process as claimed in Claim 1, in which the melt adhesive has a film thickness of up to 50μ.

7. A process as claimed in Claim 6, in which the film thickness is from 10 to 30μ.

8. A process as claimed in Claim 1 in which the melt adhesive is polyethylene.

9. A process as claimed in Claim 8 in which the foam material is a polyurethane foam.

10. A process for laminating a sheet of polyurethane foam to a textile web, comprising softening a surface of said polyurethane foam by applying thereto an amount of heat such that an insufficient amount of melted or decomposition products are obtained to enable a lasting adhesive bond between said polyurethane and said textile web, pressing a film of polyethylene having a thickness below 200μ against the heat-softened surface of said polyurethane to unite the two, heating the polyethylene surface so-provided to melt the film of polyethylene and form small droplets of melted polyethylene, and then pressing said textile web against the melted droplets of polyethylene.

11. A process as claimed in Claim 10 in which said textile web is a woven fabric.

References Cited

UNITED STATES PATENTS

| | | | |
|---|---|---|---|
| 3,251,727 | 5/1966 | Reynolds | 161—159 X |
| 3,362,862 | 1/1968 | King | 156—82 |
| 3,463,690 | 8/1969 | Converse et al. | 161—159 X |
| 2,684,319 | 7/1954 | Arnold | 156—273 X |
| 3,276,938 | 10/1966 | Malewski | 156—497 X |
| 3,547,753 | 12/1970 | Sutton | 161—160 |
| 3,669,786 | 6/1972 | Moore | 156—78 X |

WILLIAM A. POWELL, Primary Examiner

U.S. Cl. X.R.

156—82, 324, 334, 497; 161—159

UNITED STATES PATENT OFFICE
CERTIFICATE OF CORRECTION

Patent No. 3,829,343    Dated    August 13, 1974

Inventor(s)    Hans-Jurgen Remmert

It is certified that error appears in the above-identified patent and that said Letters Patent are hereby corrected as shown below:

Assignee's residence should read -- Oestrich/Rheingau, --.

Signed and sealed this 31st day of December 1974.

(SEAL)
Attest:

McCOY M. GIBSON JR.
Attesting Officer

C. MARSHALL DANN
Commissioner of Patents